United States Patent [19]

Horwitt et al.

[11] 4,168,422
[45] Sep. 18, 1979

[54] AUTOMATIC ELECTRIC CIGAR LIGHTER

[75] Inventors: Laurence G. Horwitt, New Haven; Donald J. Mattis, Norwalk, both of Conn.

[73] Assignee: Sun Chemical Corporation, New York, N.Y.

[21] Appl. No.: 841,836

[22] Filed: Oct. 13, 1977

[51] Int. Cl.$^2$ .............................................. F23Q 7/22
[52] U.S. Cl. ..................................... 219/263; 219/264; 219/265
[58] Field of Search ............... 219/260, 263, 264, 265, 219/266, 270; 337/333, 334, 342, 343, 348, 367, 369, 377, 384, 388, 390

[56] References Cited

U.S. PATENT DOCUMENTS

| 2,207,462 | 7/1940 | Kurtz | 219/265 |
|---|---|---|---|
| 2,220,978 | 11/1940 | Shakespeare et al. | 219/265 |
| 2,637,799 | 5/1953 | Wood | 219/265 |
| 2,999,142 | 9/1961 | Woodhall et al. | 337/348 |
| 3,258,567 | 6/1966 | Colavecchio | 337/334 |
| 3,870,857 | 3/1975 | Horwitt et al. | 219/270 |

Primary Examiner—C. L. Albritton
Assistant Examiner—Susan M. Hoffmann
Attorney, Agent, or Firm—Cynthia Berlow

[57] ABSTRACT

An automatic electric cigar lighter, particularly a cigar lighter igniting unit for automobiles and the like. The cigar lighter comprises a holder device presenting an outwardly facing socket, and a unique ignitor plug receivable in the socket. Disposed at the inner end of the plug is a heating element which is electrically connected in circuit with a heat-responsive switch that is also carried by the plug. The socket in addition to its grounding circuit has a "hot" contact which is engageable with a cooperable contact on the plug to effect the circuit through the heating element. The plug comprises a manually operable part by which the heat-responsive switch can be closed, thereby to complete the heating circuit through the element. A bimetallic member is also carried by the plug, engageable with one of the switch parts and normally lying in a circuit-opening position wherein it maintains the switch parts separated and from which it can be shifted to a closed-circuit position. In both positions it can receive radiant heat from the heating element, and when in the closed-circuit position it can snap to the circuit-opening position to effect opening of the lighter circuit and de-energization of the heating element after useful incandescence has been reached. Central portions of the bimetallic member are free and not attached anywhere to any parts of the plug, but instead are merely disposed in close proximity to one of the switch parts, such that the member can quickly effect opening of the switch without need for mechanical securement of its central portions. This eliminates problems previously associated with the usual fastenings made to a bimetallic member, such as securing a contact to the member, etc. Improved reliability and operation, together with faster operation, are thus realized.

19 Claims, 13 Drawing Figures

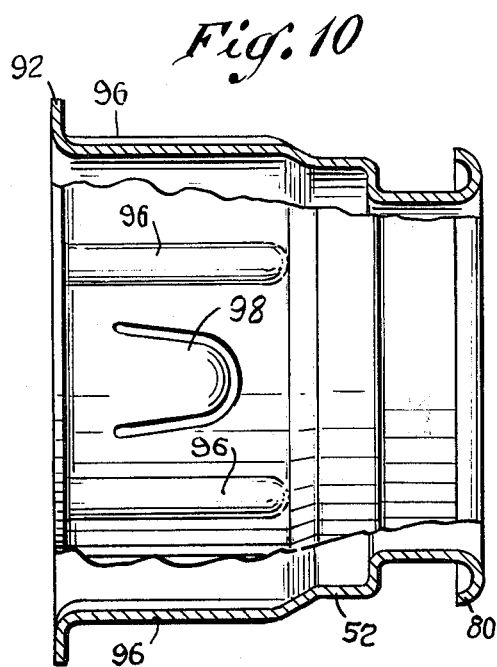
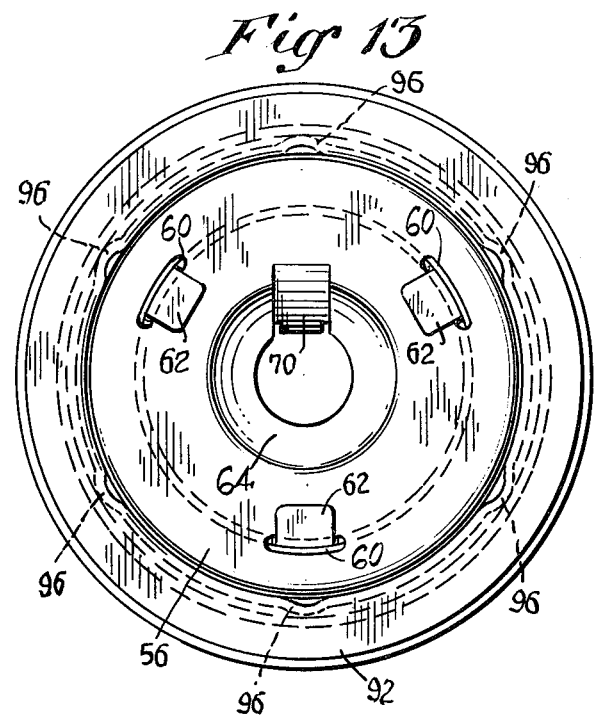
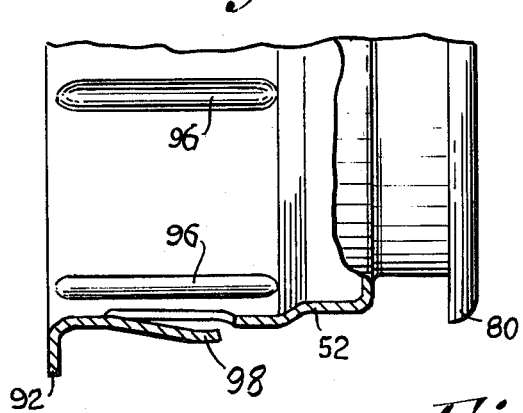
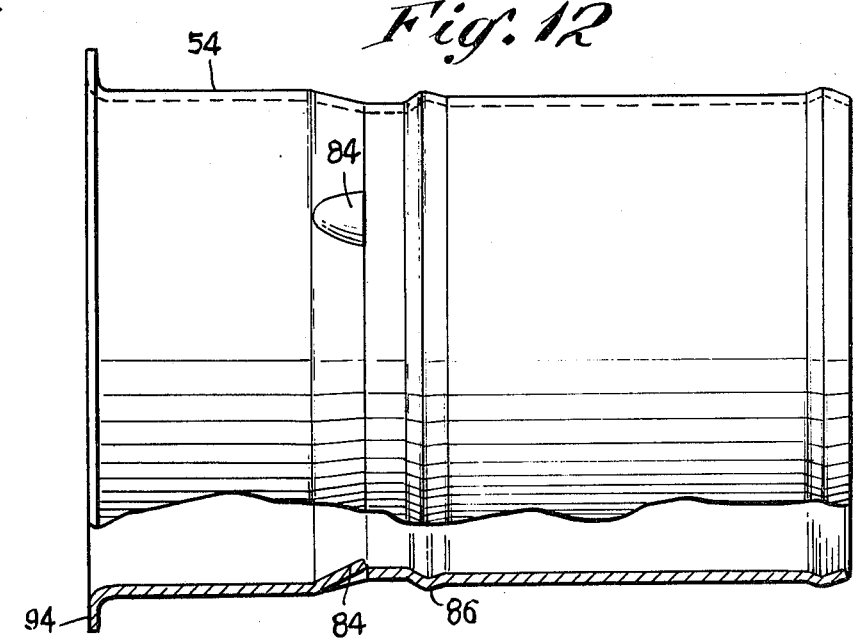

AUTOMATIC ELECTRIC CIGAR LIGHTER

BACKGROUND

This invention relates generally to cigar lighter devices for automobiles and the like, and more particularly to automatic lighters which are especially adapted to heat to useful incandescence in relatively short intervals of time.

In the past, a large number of different automatic lighter constructions have been proposed and produced. Generally they employed bimetallic spring fingers carried in a socket and which were engageable with the side surfaces of a heating element cup that was carried on the inner end of the ignitor plug. When the plug was depressed, the fingers latched over the sides of the cup, establishing a circuit through the heating element. As the element reached useful incandescence, the bimetallic fingers became heated and would then spread and release the cup and the ignitor plug, enabling the same to retract and break the circuit through the element.

Numerous refinements to this basic structure have been achieved over the years. However, problems sometimes arose, as when one of the bimetallic fingers, for reasons sometimes obscure, shifted into the path of the ignitor plug while the latter was being depressed, resulting in breakage and possible short-circuiting of the socket. This would cause either a blown fuse or else a burned-out wiring harness, depending on the degree of current overload protection built into the particular electrical system of the automobile. In other cases, the bimetallic fingers underwent an aging deformation after prolonged use. When this occurred, the socket usually had to be removed, in most cases involving work underneath or to the rear of the dashboard. Where the socket was not readily accessible, such repari or replacement was sometimes difficult and time consuming.

Typically in automatic lighters there is a period of ten to fifteen seconds following actuation of such ignitor plugs, until the heating element has reached useful incandescence and the plug snaps out in readiness for use. In the past, a number of efforts have been made to reduce this waiting time to just a few seconds. Generally, such innovative units have employed a bimetal disk disposed adjacent to the heating element, the disk constituting one contact of a switch which was adapted to open after the element reached incandescence. By positioning the disk right next to the element, response times on the order of only several seconds have been achieved, particularly when an applied voltage which exceeded the continuous rating of the heating element was employed.

Prior lighters of the type employing bimetallic disks all had a number of distinct disadvantages. Generally where the contact area of the disk was at its center, the socket was arranged to secure the disk at its periphery. The mounting for the disk had to be such that it would not interfere with its flexing and snap-type movements. This imposed stringent requirements on the tolerances of both the disk and the part which carried it. Also, in most cases the disk constituted part of the "hot" side of the circuit, and thus had to be insulated from the remainder of the socket. Accordingly, such mountings were often awkward and prone to malfunction in use.

In other constructions, as where the contact area of the disk was at its periphery, the disk was mounted by means of a stud passing through a hole in its center, the end of the stud being staked to hold the disk in place. The problem with this arrangement was that the support area was too small, and the disk eventually loosened, causing poor electrical contact with the stud. Or, if the support area was made sufficiently large, then its freedom of movement was impaired, and its proper functioning. Since both the stud and the disk were current-carrying members, any loosening caused either excessive voltage drops, or else open circuits, resulting in malfunction or failure of the device. Where the bimetallic disk itself was employed as one contact of the circuit-breaking switch, there occurred burning and pitting at the points of contact, this resulting in both a poor electrical connection and in deterioration of the disk itself, after a relatively short period of use. Moreover, where the disk was a current carrier, the relatively heavy current flow associated with such ignitor devices resulted in resistance-heating of the disk, aside from the heating effect due to its proximity to the coil. The resistance or self-heating effect depended on the resistances of the electrical path through the disk and stud; there were thus introduced other undesirable variables into the design of the lighter, which caused problems during manufacturing runs where large numbers of units were to be mass produced, from components possibly having slightly different physical and/or electrical characteristics.

Generally, the heating element of a cigar lighter is carried in a metal cup at the inner end of the ignitor plug. With spiral wound ribbon or coil type elements, the outermost convolution of the coil is as a rule secured by welding it to the annular wall of the cup. A slitted rivet or stud is disposed in the bottom wall of the cup, with the other end of the coil being inserted and secured thereto. Since the cup constituted a current carrying member in the "hot" side of the circuit, it required special material in order to insulate it from the remainder of the ignitor plug, as well as from the rivet, which is in the "cold" side of the circuit. Various arrangements for mounting the cup and rivet were employed. Different combinations of insulating bushings and/or washers generally met with success, as a rule. But with such constructions, of course, care had to be exercised in the assembly, in order to insure proper seating of the washers, and to make certan that short-circuiting of the rivet to the cup would not occur.

U.S. Pat. No. 3,870,857 issued to Laurence G. Horwitt shows a recent arrangement for mounting a heating element cup and rivet, wherein the cup is insulated from the remainder of the ignitor plug by means of a mica washer. A series of nibs on the bottom wall of the cup is received in corresponding recesses in a transverse wall of the plug body, with the mica washer being sandwiched between the two walls. This permits the use of automatic assembly equipment, in that the nibs of the cup can become seated in the recesses of the transverse wall, as a consequence of proper rotational orientation of the cup and plug body. This construction has met with wide acceptance and considerable success due to the savings of labor that were achieved while maintaining reliability.

SUMMARY

The various drawbacks and disadvantages of prior cigar lighters, and particularly the igniting units thereof as pointed out above are obviated by the present invention, which has for its main object the provision of a novel and improved automatic cigar lighter which is especially simple in its construction, reliable in operation, and which can be readily assembled with a minimum of time and effort.

A related object of the invention is the provision of an improved cigar lighter as above, wherein the response time is on the order of only several seconds, thereby making the unit more convenient to operate and use.

Still another object of the invention is the provision of an automatic lighter of the type employing a bimetallic member, wherein the latter is carried by the ignitor plug in a unique manner, and wherein its center, switch-actuating portion is free and clear of attachment to any other parts.

Still another object of the invention is the provision of an improved cigar lighter as above, wherein the bimetallic member is "cold" electrically, tat is, not connected in circuit with the heating element, thereby being unaffected by heating due to current flow through it; accordingly its response is governed entirely by heat transferred to it by radiation from the heating element.

Also, the action of the bimetallic member is not affected by variations in the applied voltage due to changes in charging rate, load changes on the vehicle electrical system, etc. As a result of the bimetallic member being not a part of the circuit, improved operating consistency is obtainable between different units of the same manufacturing run.

The above objects are accomplished by the provision of a cigar ligher which has, in combination with a holder device presenting a socket with two contacts forming part of the energizing circuit, an ignitor plug of unique construction which is still adapted to be conventionally removably carried in the socket. Disposed at the inner end of the plug is a usual type of heating element, and connected in series with the heating element circuit of the plug is a novel electrical switch having a manually operable part that can be actuated to close the circuit and thereby energize the heating element. A bimetallic disk-like switch-actuator member is provided, carried by the plug and having its center portions free and clear of attachment to any parts. The switch-actuator member is disposed closely adjacent the heating element so as to receive radiant heat therefrom, and has its actuator portion engageable with one part of the circuit-controlling switch. The arrangement is such that upon actuation of the manually operable part, the switch-actuator disk is snapped to a circuit-closing position, permitting the switch to be closed for effecting energization of the element. After the latter reaches useful incandescence, the bimetallic member again snaps, this time to its opposite or circuit-opening position wherein it opens the switch to de-energize the element.

The bimetallic member, not being a part of the circuit, undergoes no heating due to current flowing through it. Nor is it riveted or similarly secured in place. Therefore its movement is not unduly restricted, being governed only by the radiant heat received from the heating element. The response time is thus not affected by the electrical resistance of the member, or by contact resistances associated with mounting and surface areas of the member itself. The large voltage variations encountered in the automobile supply, likewise, will not have any direct effect on the bimetallic member. Since the member is not employed as a contact, there is no deterioration of the same, which might otherwise result from arcing or pitting. Moreover, since there is no part anywhere in the cigar lighter that is permanently attached to the center of the bimetallic member, there exists nothing to interfere with its normal snap or flexing movements under the influence of heat received from the heating element. Greatly improved reliability and long life expectancy are thus realized.

The invention further provides, in an improved cigar lighter of the automatic type as above, assemblages which are simple in construction and reliable in operation, and which significantly reduce the assembly time and manufacturing cost. An important feature of such assemblages is the novel arrangement which mechanically mountes the heating element and at the same time electrically insulates it at the require points, from the remainder of the structure.

Yet another object of the invention is the provision of a unique, fast-acting and simple cigar lighter as above characterized, wherein manufacturing economies are had while at the same time the device is characterized by especially long life, with little likelihood of malfunction or failure.

The above further objects are accomplished by the provision, in a cigar lighter igniting unit, of a unique combination of heating element having electrical terminal portions, a pair of metallic electrical terminal elements respectively connected to the terminal portions of the heating element and adapted to be connected to an electrical circuit for effecting energization of the element, and a surface-oxidized structural part for mounting or mechanically securing the terminal elements in space apart relation as a unitary assemblage. The structural part comprises an anodized aluminum mounting cup which has anodized electrically insulating surface areas directly engaged with the terminal elements, to not only provide a mechanically secure mounting for the heating element but also the required electrical insulation, all without reliance on additional insulating washers, bushings, and the like. Accordingly, assembly of the different parts associated with the heating element is simplified, and the manufacturing cost of the unit is kept to a low figure. Reliability of the device and freedom from malfunction, even over extended periods of operation, have been found to be excellent.

Other features and advantages will hereinafter appear.

In the accompanying drawings, illustrating several embodiments of the invention:

FIG. 1 is a vertical sectional view of the improved automatic cigar lighter of the present invention, showing the ignitor plug disposed in the holder device or receptacle, in its unenergized or storage position wherein a switch carried by the plug is open. The bimetallic switch actuator disk is in its circuit-opening position.

FIG. 2 is a view like FIG. 1 but partly in elevation, showing the manually operable part of the ignitor plug as having been shifted to a deep position in the socket of the holder device and prior to its return after finger pressure is removed. Its cooperable switch parts have been closed to effect energization of the heating element. The bimetallic switch actuator disk is in its closed-circuit position.

FIG. 3 is a view like FIGS. 1 and 2, wherein the bimetallic member or disk associated with the switch is still in its closed-circuit position and is being rapidly heated due to its closer proximity to the energized heating element. The spacer member 50 and knob 51 have returned to the position of FIG. 1 due to the removal of finger pressure.

FIG. 10 is a view, partly in side elevation and partly in section, of a tubular friction sleeve associated with the ignitor plug of FIGS. 1-3.

FIG. 11 is a fragmentary section of the sleeve of FIG. 10.

FIG. 12 is a side elevational view of a tubular ashguard associated with the ignitor plug of FIGS. 1-3.

FIG. 13 is a front elevational view of the ignitor plug of FIG. 1, except with the knob removed.

Figure 1:
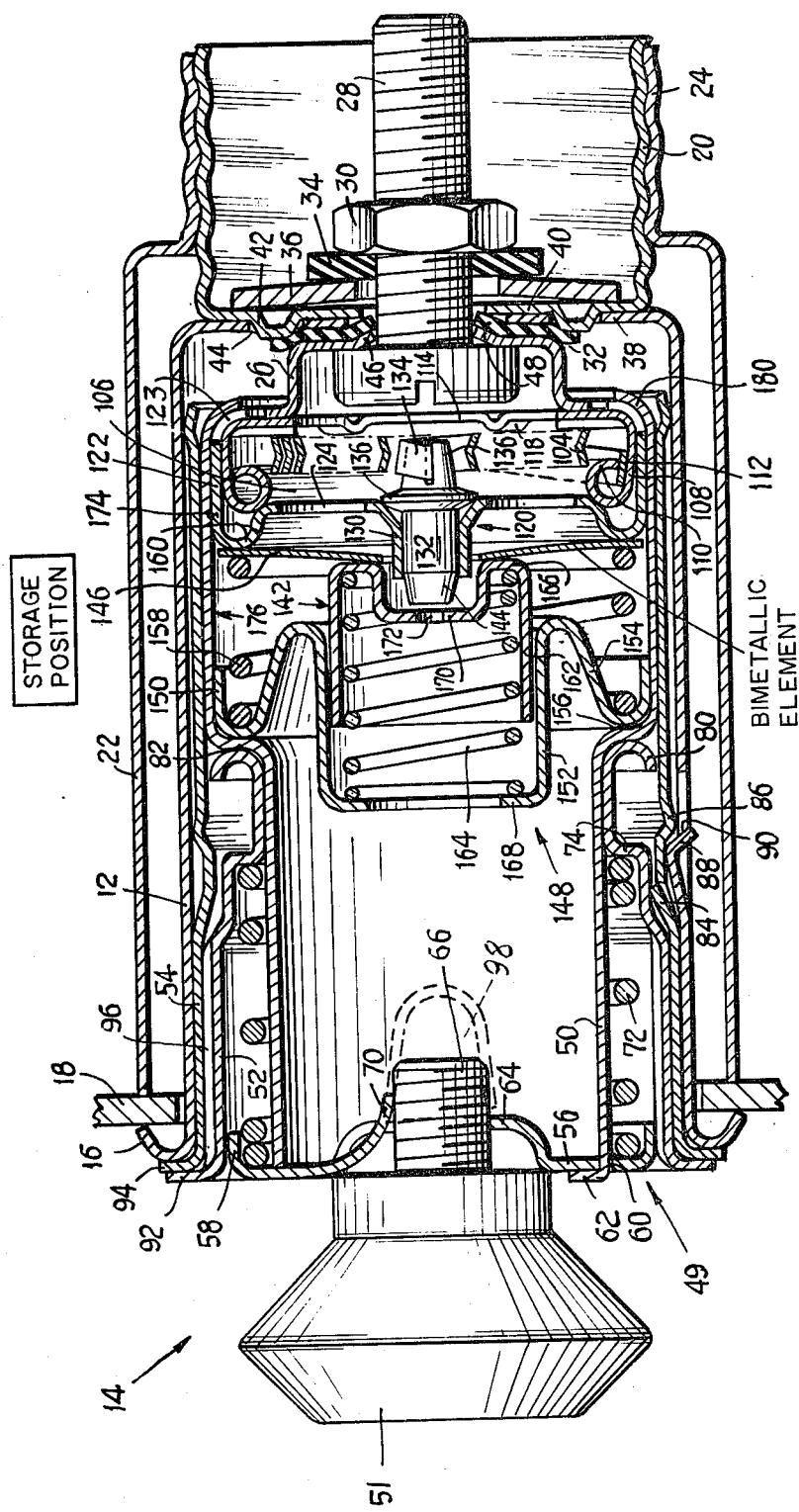
Figure 2:
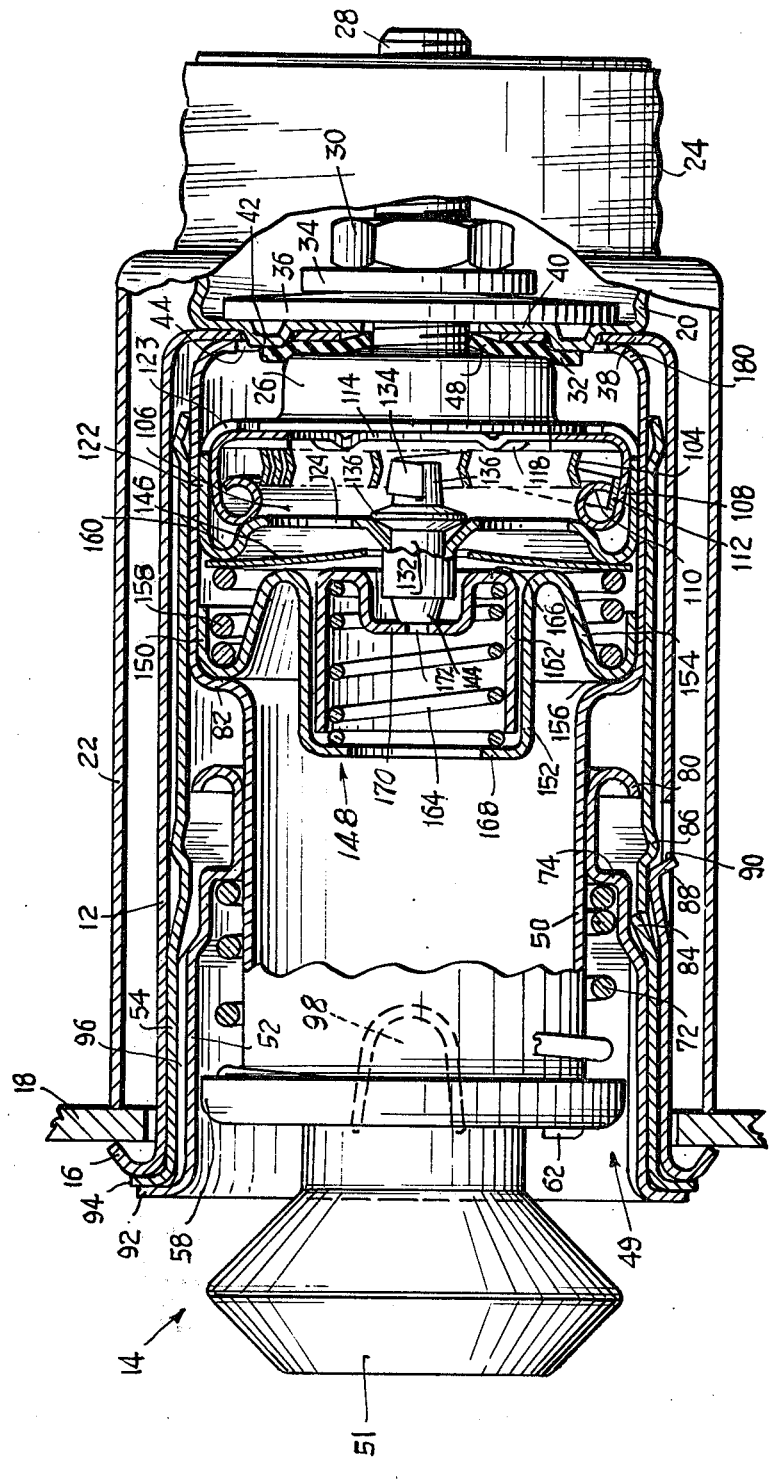
Figure 3:
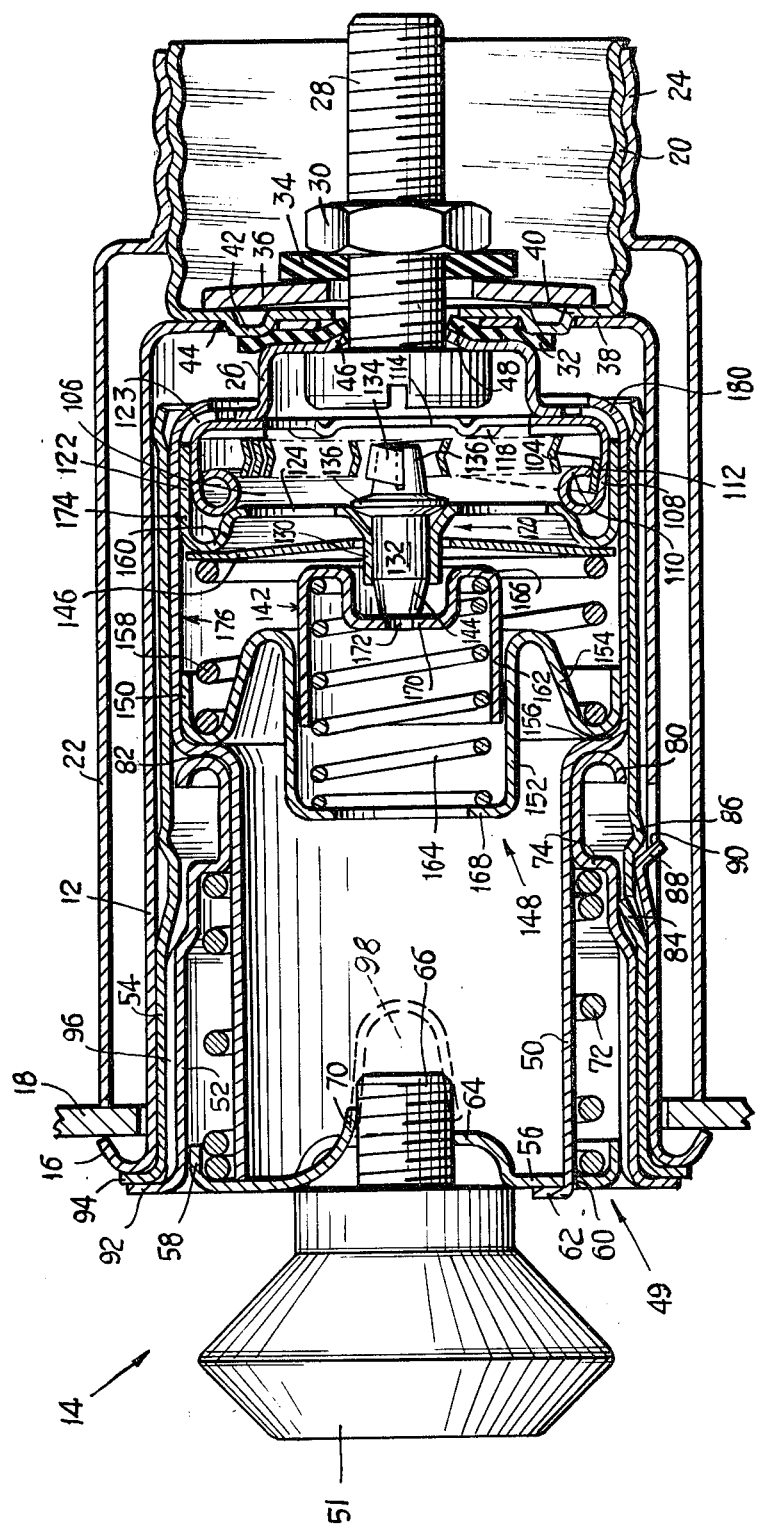

Referring first to FIGS. 1-3 there is illustrated a cigar lighter of the type adapted to be mounted on an automobile dashboard, comprising a receptacle or holder device 12 which includes a socket, and a generally cylindrical ignitor plug 14. The receptacle 12 has a radially outwardly extending annular flange 16 which engages the front surface of the automobile dashboard 8. At the rear, the receptacle mounts a threaded shell 20, on which there is screwed a tubular clamping shell 22 having a corresponding threaded portion 24 mating with the shell 20. The front end of the clamping shell bears against the rear surface of the dashboard as shown, to thereby hold the receptacle 12 in a fixed position thereon.

The receptacle or socket 12 has a dish-shaped metal contact member 26 which is insulatedly mounted therein by means of a threaded stud 28 and nut 30. Carried on the stud are insulating washers 32, 34 and a spring washer 36. The stud extends through aligned apertures in the inner transverse wall 38 of the receptacle 12 and in the transverse or bottom wall 40 of the screw shell 20, thereby to retain the contact member 26, receptacle 12 and screw shell 20 in assembled relation. The transverse wall 40 includes alignment nibs 42 which are stamped out therefrom and which extend into corresponding apertures 44 in the shell. These key the shell 20 to the remainder of the receptacle 12 and prevent relative turning movement between the two parts during installation of the unit.

As shown, the contact member 26 has a conical seat 46 at its center. The diameters of the aligned apertures in the walls 38, 40 exceed the diameter of the stud 28 by a substantial amount, thereby providing clearance space between the walls of the apertures and the stud to insure adequate insulation of the stud. Similarly, the diameter of the hole in the spring washer 36 is sufficiently large to provide adequate clearance around the stud. The portion 48 of the washer 32 is deformed to extend partially into the aperture in the transverse wall 38 of the receptacle 12, and the conical seat 46 thus centralizes the stud with respect thereto during assembly.

Referring again to FIG. 1, the unique ignitor plug 14 of the invention includes a tubular plug body assemblage 49 comprising a manually operable part or spacer member 50 and a knob 51, the member 50 being generally in the form of a hollow cylinder. A friction sleeve 52 is telescopically carried on the spacer member 50, and a retractable ashguard generally designated 54 and particularly ilustrated in FIG. 12 also constitutes part of the plug body assemblage and is telescopically carried by the spacer member 50 and movable thereon between limits, as will be later brought out. Disposed at the end of the spacer member 50 is a cap 56 having an annular flange 58 extending past the periphery of the member 50. The cap 56 has a series of slots 60, as shown in FIG. 13, and corresponding lugs 62 on the spacer member extend through the slots and are bent radially inward to thereby hold captive the cap 56. The cap 56 also has a central indented portion 64 which is apertured to receive a threaded mounting stud 66 of the knob 51. The cap 56 includes an integral spring pressure tooth 70 which engages the threads of the stud and enables the knob to be merely screwed into the cap as shown.

The flange 58 constitutes a seat for one end of a coil spring 72, the other end of the spring bearing against an internal shoulder 74 on the friction sleeve 52 and the latter having an outwardly extending annular curl 80 which normally bears against a transverse shoulder 82 on the spacer member 50. As shown in FIG. 12, the ashguard 54 has a series of lugs 84 struck from its annular wall portion. In the present construction, three such lugs are disposed circumferentially about the body of the guard. The lugs 84 project inwardly into the path of the curl 80 when the ignitor plug is being withdrawn from the socket, and position the ashguard so as to encircle a heating element to be described below, as the plug is removed from the receptacle. The ashguard 54 further includes a circumferential bead 86 which is engaged by one or more spring fingers 88 lanced from the annular wall of the receptacle 12. The fingers include camming portions 90 which limit outward or rearward axial movement of the ashguard when the ignitor plug 14 is being withdrawn, as there occurs engagement of the ends of the lugs 84 with the curl 80 of the friction sleeve 52. This results in the heating element being recessed within the ashguard at such times that the ignitor plug is withdrawn from the socket.

At its front end the friction sleeve 52 has an outwardly extending annular flange 92 which normally bears agaist a corresponding flange 94 on the ashguard 54. The limits of relative axial movement of the friction sleeve 52 with respect to the ashguard 54 are thus determined in one direction by the engagement of the flanges 92, 94 and in the other direction by engagement of the curl 80 with the lugs 84 of the ashguard.

In order to provide a smooth, non-binding and sliding engagement between the friction sleeve 52 and the ashguard 54, there are provided on the cylindrical exterior surface of the sleeve a plurality of circumferentially spaced longitudinal ribs 96 which slidably engage the inner cylindrical surface of the ashguard. These ribs are particularly illustrated in FIGS. 10 and 11, and operate to reduce binding between the parts ad prevent axial misalignment thereof. In order to exert frictional resistance against relative axial movement of the friction sleeve 52 and the ashguard 54, the cylindrical body of the sleeve is lanced at several locations, preferably spaced circumferentially about the sleeve, providing yieldable friction fingers 98 which bear with calibrated pressure against the inner cylindrical surface of the ashguard. The pressure is sufficient to retain the ashguard in any selected axial positions to which it is moved with respect to the sleeve. The ribs 96 of the sleeve assure constant uniform spacing between the two parts, to prevent undesirable variation in the side pressure exerted on the inner surface of the guard by the friction fingers 98. Accordingly the base area of the fingers 98 will not be "sprung" by improper alignment. Disposed at the inner end of the ignitor plug 14 is a spiral-wound heating element or coil 104 which can be constituted as a ribbon of "V" cross section with successive convolutions interlocking one another to form a disk-like structure.

Figure 8:
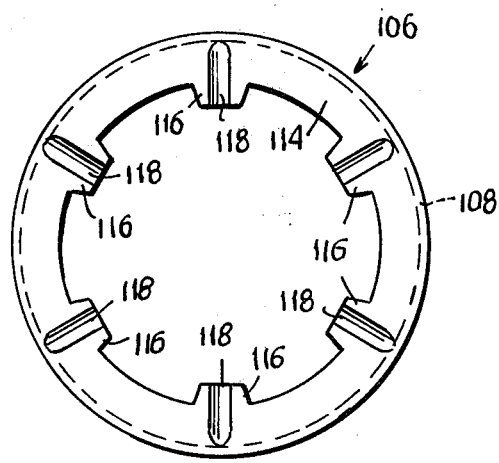
FIG. 8 is a right end elevational view of a contact cup or member which carries the heating element, the contact cup being associated with the support cup of FIG. 7 in the ignitor plug of FIGS. 1-3.
Figure 9:
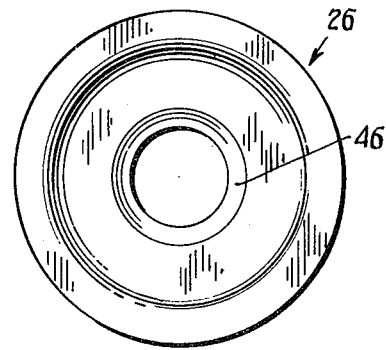
FIG. 9 is a left end elevational view of a dish-shaped contact member carried in the socket of the igniting unit of FIGS. 1-3.

In accordance with the present invention there is provided a novel mounting arrangement for the heating element, involving mainly a single metallic, dual-function member which effects both a mechanical support for and electrical insulation between the opposite ends or terminal elements of the coil 104. In the assemblage invovling such dual-function member there is included an annular, metal terminal and coil support element 106 which is particularly illustrated in FIG. 8, having an outer wall 108 and a curled-in rim 110. In the appended claims, the element 106 is specifically referred to as a "support member". As shown, the heating element 104 is disposed within the member 106, with its outer end or terminal portion 112 secured by being sandwiched or crimped under the rim 110. This can be accomplished in a suitable punch and die (not shown) which effect both the initial curling operation and the final crimping operation in a single step. By such arrangement, the outer terminal portion 112 of the heating coil 104 is permanently both mechanically secured and electrically connected to the coil support member 106.

The member 106 further includes an inturned flange 114 lying substantially in a radial plane, having a series of lugs 116 extending inwardly therefrom. These lugs 116 are adapted to engage the dish-like contact member 26 of the receptacle 12 when the ignitor plug 14 is in the positions of FIGS. 1, 2 and 3. The lugs 116 are formed with strengthening, spacer ribs 118 which protrude toward the heating coil 104 from the plane of the flange 114 and engage the outermost coil convolutions to provide mechanical support thereto.

Figure 7:
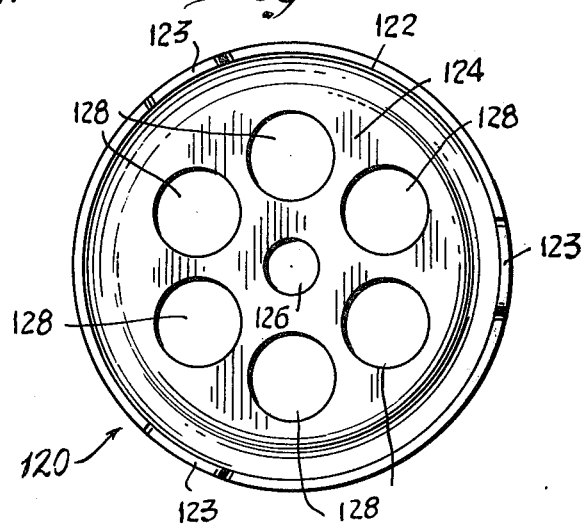
FIG. 7 is a right end elevational view of a heating element support cup carried by the ignitor plug of FIGS. 1-3.

The unique dual-function member as provided by the present invention comprises an anodized aluminum cup 120 in which the coil support member 106 is nested. The cup 120 has three lugs 123 shown in FIG. 7 which are bent inward after the assembly with the member 106, thereby to hold captive the member 106 in the cup, and the latter has an annular side wall 122 and bottom wall 124 provided with a tubular boss 130 defining a central aperture 126 (FIG. 7). The bottom wall 124 of the cup 120 also has a series of circumferentially-spaced heat-passages or holes 128 surrounding the central aperture, for purposes shortly to be described. The inner surface of the annular wall 122 of the aluminum cup 120 engages the annular external surface area of the wall 108 of the metal coil support member 106 but remains adequately electrically insulated therefrom by virtue of the anodizing of the cup.

Pressed into the boss 130 is a metal rivet 132 constituting a terminal element which is connected to the innermost end 134 of the heating coil 104. The surface of the boss 130 which engages the rivet 132 also has an insulating anodized coating, enabling the rivet to remain electrically insulated from the member 120 even though it is mechanically secured thereto. The rivet 132 has a stop shoulder 136 and is slotted to receive the inner end portion 134 of the coil.

Further, in accordance with the invention, there is provided a novel two-part electrical switch connected in circuit with the heating coil 104, and a unique bimetallic actuator member 146 associated therewith, adapted to open the circuit through the coil after it has reached useful incandescence.

Figure 4:
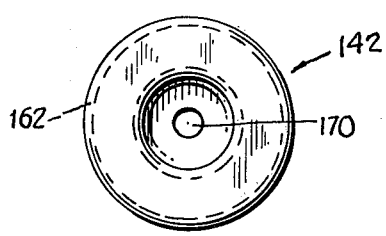
FIG. 4 is a right end elevation of the contact cup carried by the ignitor plug shown in FIGS. 1-3, the cup constituting one of the cooperable switch parts.
Figure 5:
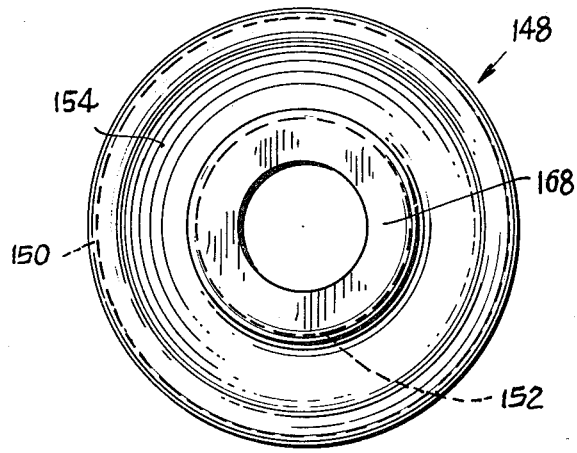
FIG. 5 is a left end elevation of a bearing cup carried by the ignitor plug, for enabling limited sliding movement of the contact cup with respect to the plug body.
Figure 6:
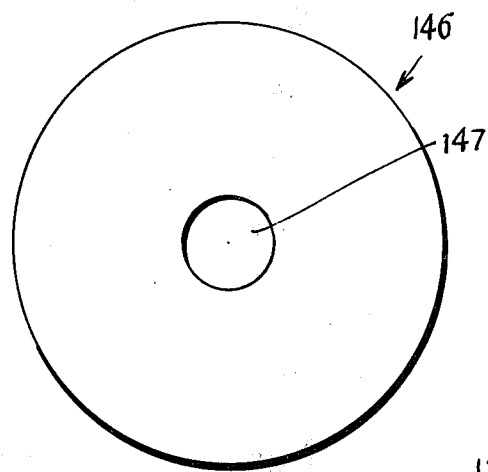
FIG. 6 is a side elevational view of the bimetallic member associated with the ignitor plug of FIGS. 1-3.

One part of the switch comprises a movable contactor device or cup 142 which is particularly illustrated in FIG. 4, and the other part includes a contact portion or surface 144 on that end of the rivet 32 which extends forward from the boss 130. The bimetallic member or operator 146 is in the form of a disk, (FIG. 6), havng a central aperture 147 surrounded by an actuator portion which is adjacent to the contact cup 142 of the switch. As shown, the disk 146 lies in a plane which is generally perpendicular to the axis of the plug body 50. A bearing cup 148 constituting a guide for the contact cup 142 is also provided, said bearing cup having outer and inner concentric annular walls 150, 152 respectively connected by a conical wall 154. The bearing cup is closely-fitted in the body or spacer member 50, and seats against an annular internal shoulder 156 therein. The walls 150 and 154 together form a seat for one end of a compression coil spring 158, the other end of which bears against one face of the bimetallic disk 146. The peripheral portions of the other face of the disk 146 seat against an annular shoulder 160 on the anodized mounting member 120. The disk is thus sandwiched in an operative position between the member 120 and the spring 158 even when the latter undergoes compression, as will be explained below.

Referring again to FIGS. 1–3, the contact cup 142 has an annular wall 162 which has a sufficiently loose, non-binding fit with the wall 152 of the bearing cup so as to enable free sliding movement of the two parts. A compression coil spring 164 is carried by the contact cup, engaging the transverse or bottom wall 166 thereof and having its other end seating against a transverse or bottom wall 168 of the bearing cup 148. The wall 166 of the cup 142 comprises an inwardly offset portion 170 which constitutes a contact surface for engagement with the contact portion 144 of the rivet 132. In addition, at the center of the offset 170 is an aperture 172 of smaller diameter than the dimensions of the end of the rivet 132, this construction resulting in a more even distribution of contact pressures of the switch.

Referring again to FIGS. 1–3, it can be seen that the aperture of the bimetallic disk 146 provides clearance for the rivet 132 and boss 130 of the mounting member 106. As shown, sufficient clearance is provided so that no engagement between the two parts occurs. The spring 164 normally maintains the wall 166 of the contact cup 142 in engagement with the central portions of the disk 146 for the open-circuit condition of the lighter shown in FIG. 1.

It will be seen from FIGS. 1–3 that although the disk 146 is at "ground" or return-circuit potential, it does not at any time carry the heating element current, because of its mounting. The spring 158 and shoulder 160 constitute a means which mounts the bimetallic member 146 in the plug 49 so as to maintain the central bimetallic actuator portions thereof out of contact with any parts of the heating element circuit when the member is in the closed-circuit position of FIGS. 2 and 3.

The operation of the improved automatic lighter of the present invention may now be readily understood by referring to FIGS. 1-3 in succession. FIG. 1 illustrates the relative positions of the various components with the lighter in the storage or unactuated position, wherein the positive terminal of the battery is intended to be connected to the stud 28, this being conveniently hereinafter referred to as the "hot" side of the circuit. The other terminal of the battery is connected to the vehicle dashboard 18, constituting the return side of the circuit. It is noted that with the component positions of FIG. 1, the lugs 116 of the contact member 106 (FIG. 8) are in engagement with the dish-like contact member 26 of the socket. No current flows through the heating coil, however, since the switch parts 132, 142 are disengaged by virtue of the bimetallic disk 146 biasing the contact cup 142 toward the left.

When it is desired to use the lighter, the manually operable part comprising the knob 51 and spacer or body member 50 is depressed in the socket from the shallow position of FIG. 1, to the deep position of FIG. 2. This accomplishes several things. The spacer member 50 has carried the bearing cup 148 toward the right, while the mounting member 120, support member 106, and heating coil 104 remain stationary. The hard anodizing of the aluminum mounting member 120 presents a good slide bearing surface in engagement with wall 176. This enables a smooth movement to occur between these parts as the knob 51 is being depressed. The unitary assemblage consisting of the mounting member 120, circuit member 106, and heating coil 104 remains stationary. A peripheral flange 180 on the spacer member 50, which engages and holds captive the mounting member 120 for the position of FIG. 1, now has shifted and is engaged with the wall 38 of the receptacle. Compression of the spring 158 causes a tight engagement of the contact lugs 116 (FIG. 8) with the dish-like contact member 26, insuring good electrical contact therewith. Initially the bearing cup 148 and contact cup 142 have moved as a unit, until the latter became engaged with the contact portion 144 of the rivet, after which further movement of the bearing cup 148 effects compression of the spring 164, causing firm engagement of the wall 170 with the rivet portion 144. While the bearing cup 148 and contact cup 142 are initially moving togther, a point is reached where the bimetallic disk 146 (still cold) snaps under the action of the bearing cup from the open-circuit position of FIG. 1 to the closed-circuit position of FIG. 2. This occurs before and during engagement of the cup wall 170 with the rivet 132. With the components in the relative positions of FIG. 2, a circuit is completed through the heating coil 104 as follows: Current flows from the stud 28 through the contact member 26 to the support member 106, through heating coil 104 to the rivet 132, then to the contact cup 142 and spring 164 and to the cup 148, through the spacer member 50, friction sleeve 52 and ashguard 54 to the receptacle 12 and the panel 18. Portions of the inner walls of the receptacle 12 constitute one of the two contacts in the receptacle. FIGS. 1-3 show in dotted outline one of the three friction fingers 98 on the friction sleeve 52. These bear against the inner surface of the ashguard 54, and thus insure good electrical contact therewith. After depressing the knob 51, the user removes the pressure, and the spacer member 50 and knob 51 are returned to the FIG. 1 position under the action of the spring 72, but the spring 164 now expands and maintains the contact between the cup 142 and rivet 132. This is illustrated in FIG. 3. After several seconds have elapsed, the heating element 104 reaches useful incandescence, and heat is transferred by radiation through the holes 128 (FIG. 7) to the bimetallic disk 146. When the disk has heated sufficiently, it snaps back to the position illustrated in FIG. 1, at the same time effecting disengagement of the cup 142 and rivet 132. This opens the circuit through the heating coil 104. At the time that the disk snaps back to the position of FIG. 1, an audible click is heard, indicating to the user that the lighter is now ready for use.

As the knob 51 and spacer member 50 are withdrawn from the socket 12, the ashguard 54 at first remains stationary by virtue of the engagement of the bead 86 with the spring fingers 88. Thus, the spacer member 50, friction sleeve 52, cups 142, 148, mounting member 120, and heating coil 104 move together as a unit with respect to the ashguard 54 until there occurs engagement of the lugs 84 and the outward annular curl 80 of the friction sleeve, following which the components listed above and the ashguard move as a unit. The heating coil 104 is now recessed within the circular edge of the ashguard by ¼ inch or so. Under such circumstances the annular flange 92 of the friction sleeve 52 is spaced a short distance from the flange 94 of the ashguard 54 while the ignitor plug is out of the socket.

Upon reinstallation in the socket, the knob 51 is depressed a sufficient amount such that, after the ashguard flange 94 engages the socket flange 16, the friction sleeve 52 and spacer member 50 continue to move with respect to the ashguard until the flange 92 engages the flange 94. This corresponds to full retraction of the ashguard with respect to the support member 106 and heating coil 104. At this point the user will experience additional resistance toward further insertion of the knob and spacer member into the socket, and the nesting engagement of the flanges 92, 94 will provide a visual indication to the user that the plug is now returned to the normal, unenergized or storage position.

The above construction is seen to have the following advantages, resulting in improved operation and long life expectancy. Since the contact areas of the two-part switch are independent of the bimetallic member or disk, the latter does not undergo any deterioration due to arcing or pitting of switch contacts. Also the bimetallic member does not suffer any appreciable wear or abrasion. Accordingly its function is not impaired even after extended periods of use. Moreover, since the member is not a part of the electrical circuit, there is eliminated from the design of the lighter, undesirable variables relating to the physical electrical-resistance characteristics of the member itself, such as the self-heating effect due to current flowing through it, or contact and surface resistances associated therewith. There is thus retained in the lighter design the high reliability inherent in a simple bimetallic disk, the latter being virtually unmodified when installed and used in the ignitor device. The close proximity of the bimetallic member to the heating coil results in a relatively quick response, enabling the use of a heating coil which heats rapidly at the applied voltage, without danger of over-heating or burnout.

The novel combination involving the mechanical support for the heating coil represents a very workable solution to the problem of properly mounting a coil at the inner end of an ignitor plug. It eliminates the use of insulating washers and bushings, thus minimizing the possibility of short-circuiting; simplified assembly is thus realized, with no sacrifice in overall reliability.

In the present construction, un-like many other cigar lighters built in the past few years, the ignitor plug does not move outwardly from the socket when the heating coil has reached incandescence. But the unit still provides an audible "click" when ready, as the bimetallic member opens the switch. There are no sudden acceleration or deceleration "impulse" forces applied to the heating coil, as will be understood. This has been a problem in other lighters designs, since impulse movements experienced by many of the devices heretofore known resulted in severe mechanical shock to the heating element, these being especially damaging when the element was in an incandescent state. Weakening and fatigue of the element eventually occurred as a result. It should be realized that the heating element ribbon weakens physically as its temperature is increased. Also, by the present construction which involves no bimetallic spring fingers, there is eliminated the possibility of the plug popping completely out of the socket. This was a problem in some prior units, wherein the inertia of the plug as the fingers released the heating element cup could cause the plug to eject.

In the present construction all critical or moving parts are carried in the ignitor plug and not in the socket. Should failure ever occur it is most likely to be associated with parts carried by the plug, and not the socket. Accordingly, by the present construction, servicing is simplified since it involves a mere replacement of an ignitor plug rather than a repair of the socket. Since the socket contains so few parts, there is little or no occasion for maintenance or servicing of the same. While there are a number of separate components involved in the present lighter, they are readily assembled to one another without reliance on special tools, and without involvement in critical positioning or placement of the parts. Accordingly, some production steps can be handled by automatic assembly equipment, resulting in low costs, especially where manufacturing runs of several hundreds of thousands of units are being made.

The present lighter construction also features a convenient re-light capability. Following an initial energization, the plug can be quickly re-energized, since the resetting is effected by the depressing movement of the plug.

As a consequence of the features outlined above, many of the undesirable characteristics of prior lighter devices have been eliminated. There is thus provided a unit having substantially less likelihood of malfunction and failure, especially after a period of use involving thousands of repeated operations under extremes of temperature normally experienced in automobiles and other vehicles.

The present invention is thus seen to represent a distinct advance and improvement in the technology of cigar lighter ignitor devices.

Each and every one of the appended claims defines a distinct aspect of the invention separate from the others, and each claim is accordingly to be treated in this manner when the prior art devices are examined in any determination of novelty or validity.

Variations and modifications are possible without departing from the spirit of the invention, and certain portions of the improvement may be used without others.

What is claimed is:

1. An automatic cigar lighter, comprising in combination:
   (a) a holder device including a socket having two contacts forming part of a cigar lighter circuit,
   (b) an ignitor plug receivable in the socket, said plug having a manually operable part,
   (c) a heating element carried at the inner end of the plug,
   (d) means for establishing a circuit from the holder device contacts through the heating element, said means including an electrical switch having cooperable parts carried by the ignitor plug,
   (e) means for closing said switch and energizing said heating element in response to actuation of said manually operable part, and
   (f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch,
   (g) said ignitor plug including means for mounting the heating element at the inner end of the plug,
   (h) said mounting means comprising a mounting member, and a rivet carried thereby, connected with one end of said element,
   (i) said rivet having a contact portion at one end,
   (j) said contact portion constituting one of said cooperable switch parts.

2. The invention as set forth in claim 1, wherein:
   (a) said ignitor plug comprises a tubular plug body,
   (b) the other of said cooperable switch parts comprising a contact cup carried by the plug body,
   (c) said contact cup having a bottom wall providing a contact surface for engagement with the contact portion of said rivet.

3. The invention as defined in claim 2, wherein:
   (a) said bottom wall of the contact cup has an aperture substantially aligned with the axis of said rivet,
   (b) said contact surface being annular and closely adjacent the walls of the aperture.

4. An automatic cigar lighter, comprising in combination:
   (a) a holder device including a socket having two contacts forming a part of a cigar lighter circuit,
   (b) an ignitor plug receivable in the socket, said plug having a manually operable part,
   (c) a heating element carried at the inner end of the plug,
   (d) means for establishing a circuit from the holder device contacts through the heating element, said means including an electrical switch having cooperable parts carried by the ignitor plug,
   (e) means for closing said switch and energizing said heating element in response to actuation of said manually operable part,
   (f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch.
(g) said manually operable part of the ignitor plug being moveable between deep and shallow positions in said socket,
(h) spring means biasing one of said cooperable switch parts into engagement with the other when the manually operable part of the ignitor plug is disposed in its deep position in the socket,
(i) said ignitor plug comprising a tubular plug body,
(j) said one cooperable switch part comprising a contact cup, and
(k) means carried by the plug body and providing a guide to enable the contact cup to have limited sliding movement with respect to the body, as the cooperable switch parts are being brought into engagement with one another,
(l) said guide comprising a bearing cup disposed in the tubular plug body,
(m) said cups having annular telescoping wall portions respectively slidably engaging one another,
(n) said spring means engaging bottom wall portions respectively of said cups.

5. An automatic cigar lighter, comprising in combination:
(a) a holder device including a socket having two contacts forming part of a cigar lighter circuit,
(b) an ignitor plug receivable in the socket, said plug having a manually operable part,
(c) a heating element carried at the inner end of the plug,
(d) means for establishing a circuit from the holder device contacts through the heating element, said means including an electrical switch having cooperable parts carried by the ignitor plug,
(e) means for closing said switch and energizing said heating element in response to actuation of said manually operable part,
(f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch,
(g) said ignitor plug comprising a tubular plug body,
(h) a mounting member carrying said heating element at the inner end of said body,
(i) said mounting member having means providing a bearing surface for sliding engagement with a cooperable bearing surface of said plug body,
(j) said mounting member being movable between advanced and retracted positions with respect to said plug body, and
(k) spring means carried by said body and biasing said mounting member to an advanced position with respect to said body,
(l) said mounting member assuming a retracted position with respect to the body when the manually operable part is actuated.

6. An automatic cigar lighter, comprising in combination:
(a) a holder device including a socket having two contacts forming part of a cigar lighter circuit,
(b) an ignitor plug receivable in the socket, said plug having a manually operable part,
(c) a heating element carried at the inner end of the plug,
(d) means for establishing a circuit from the holder device contacts through the heating element, said means including an electrical switch having cooperable parts carried by the ignitor plug,
(e) means for closing said switch and energizing said heating element in response to actuation of said manually operable part,
(f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch,
(g) said ignitor plug comprising a tubular plug body,
(h) a mounting member carrying said heating element at the inner end of said body,
(i) said mounting member normally engaging peripheral edge portions of one face of said bimetallic member, and constituting a seat therefor, and
(j) a coil spring carried by the plug body and having one end engaging the other face of the bimetallic member, to thereby hold the latter in an operative position against the mounting member.

7. The invention as set forth in claim 6, wherein:
(a) central portions of said other face of the bimetallic member are engageable with one cooperable part of said switch, for effecting actuation of the same.

8. The invention as set forth in claim 6, and further including:
(a) a rivet carried by said mounting member and secured to one end of the heating element,
(b) said rivet projecting beyond adjacent portions of said mounting member, and constituting one of said switch parts,
(c) means defining a central aperture in said bimetallic member,
(d) portions of said rivet extending through said aperture, for engagement with the other of said switch parts during actuation of said switch.

9. An automatic cigar lighter, comprising in combination:
(a) a holder device including a socket having two contacts forming part of a cigar lighter circuit,
(b) an ignitor plug receivable in the socket, said plug having a manually operable part,
(c) a heating element carried at the inner end of the plug,
(d) means for establishing a circuit from the holder device contacts through the heating element, said means including an electrical switch having cooperable parts carried by the ignitor plug,
(e) means for closing said switch and energizing said heating element in response to actuation of said manually operable part,
(f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch, (g) said circuit-establishing means comprising a contact member engageable with one of said socket contacts, and (h) spring means carried by said plug for biasing said contact member into firm engagement with said one socket contact.

10. The invention as set forth in claim 9, wherein:

(a) said bimetallic member is disposed intermediate said contact member and said spring-biasing means, (b) said spring-biasing means engaging peripheral portions of one face of said bimetallic member to thereby hold the latter in an operative position.

11. An automatic cigar lighter, comprising in combination:

(a) a holder device including a socket having two contacts forming part of a cigar lighter circuit, (b) an ignitor plug receivable in the socket, said plug having a manually operable part, (c) a heating element carried at the inner end of the plug, (d) means for establishing a circuit from the holder device contacts through the heating element, said means including an electrical switch having cooperable parts carried by the ignitor plug, (e) means for closing said switch and energizing said heating element in response to actuation of said manually operable part, and (f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch, (g) one of said socket contacts comprising a dish-like contact member, (h) said circuit-establishing means comprising an annular contact member on the plug, connected with said heating element and cooperable with said one socket contact member, (i) said plug contact member having multiple resilient lugs adapted for engagement with peripheral portions of said dish-like socket contact member.

12. The invention as set forth in claim 11, wherein:

(a) said heating element is disposed within said plug contact member, (b) said lugs having reinforcing ribs extending toward the heating element and adapted to engage and to provide support for peripheral portions thereof.

13. An automatic cigar lighter, comprising in combination:

(a) a holder device including a socket having two contacts forming part of a cigar lighter circuit, (b) an ignitor plug receivable in the socket, said plug having a manually operable part, (c) a heating element carried at the inner end of the plug, (d) means for establishing a circuit from the holder device contacts through the heating element, said means including an electrical switch having cooperable parts carried by the ignitor plug, (e) means for closing said switch and energizing said heating element in response to actuation of said manually operable part, (f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch, and (g) a mounting member disposed at the inner end of said ignitor plug, said heating element being carried by said mounting member, (h) one wall of said mounting member being disposed between the heating element and the bimetallic member, (i) said wall having apertures to enable heat from the heating element to be transferred to the bimetallic member by radiation.

14. An automatic cigar lighter, comprising in combination:

(a) a holder device including a socket having two contacts forming part of a cigar lighter circuit, (b) an ignitor plug receivable in the socket, said plug having a manually operable part, (c) a heating element carried at the inner end of the plug, (d) means for establishing a circuit from the holder device contacts through the heating element, said means including an electrical switch having cooperable parts carried by the ignitor plug, (e) means for closing said switch and energizing said heating element in response to actuation of said manually operable part, (f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch, (g) said ignitor plug comprises a tubular plug body, and (h) means on said body for mounting said bimetallic member in an operative position lying generally in a plane substantially perpendicular to the axis of the tubular plug body, (i) an annular mounting member carrying said heating element and disposed at the inner end of said ignitor plug, (j) said mounting member having an annular shoulder engaged with the bimetallic member, and (k) a coil spring disposed in said body and having one end engageable with peripheral portions of said bimetallic member to bias the latter against said shoulder.

15. An automatic cigar lighter, comprising in combination:

(a) a holder device including a socket having two contacts forming part of a cigar lighter circuit, (b) an ignitor plug receivable in the socket, said plug having a manually operable part, (c) a heating element carried at the inner end of the plug, (d) means for establishing a circuit from the holder device contacts through the heating element, said means including an electrical switch having cooperable parts carried by the ignitor plug, (e) means for closing said switch and energizing said heating element in response to actuation of said manually operable part, (f) means responsive to heating of said heating element, for opening said switch to de-energize the element, said means including a bimetallic member carried by said plug and having a circuit-opening position and a closed-circuit position, said member having a bimetallic actuator portion which is free and clear of attachment to any other parts, said actuator portion being adapted for abutting engagement with one of the cooperable parts of said switch to effect said opening of the switch, (g) said ignitor plug comprising a tubular plug body, (h) one of said switch parts comprising a movable contactor device, and (i) a bearing member carried by the plug body and slidably mounting the contactor device within the tubular body, (j) said bearing member comprising spaced-apart outer and inner annular walls, (k) said inner annular wall slidably engaging the contactor device, (l) said bearing member being axially movable with respect to the bimetallic member as the manually operable part of the ignitor plug is actuated, thereby to actuate the bimetallic member and bias it to its closed-circuit position.

16. An electricl cigar lighter, comprising in combination:

(a) a holder device including a socket having two contacts forming part of a cigar lighter circuit, (b) an ignitor plug receivable in the socket, said plug having a manually operable part, (c) a heating element carried at the inner end of the plug, (d) means for establishing a circuit from the holder device contacts through the heating element, said means including an electrical switch having cooperable parts carried by the ignitor plug, (e) means for closing said switch and energizing said heating element in response to actuation of said manually operable part, (f) means responsive to heating of said heating element, for opening said switch to de-energize the element, said means including a bimetallic member carried by said plug and having a circuit-opening position and a closed-circuit position, said member having a central bimetallic actuator portion which is adapted to actuate one of the cooperable parts of said switch to effect said opening of the switch, and (g) clamping means engaging peripheral portions of said bimetallic member, said clamping means comprising an abutment member and a coil spring engaging opposite sides respectively of the bimetallic member so as to secure said bimetallic member in an operative position between said abutment member and said spring without impeding the flexing movement of the bimetallic member.

17. The invention as set forth in claim 16, wherein:

(a) said bimetallic actuator portion is free and clear of attachment to any other parts, (b) said actuator portion being adapted for solely abutting engagement with said one switch part.

18. An electric cigar lighter, comprising in combination:

(a) a holder device including a socket having two contacts forming part of a cigar lighter circuit, (b) an ignitor plug device receivable in the socket, said plug device having a manually operable part, (c) a heating element carried at the inner end of the plug device, (d) means for establishing a circuit from the holder device contacts through the heating element, said means including an electrical switch having cooperable parts, (e) means for closing said switch and energizing said heating element in response to actuation of said manually operable part, (f) means responsive to heating of said heating element, for opening said switch to de-energize the element, said means including a bimetallic member carried by one of said devices and having a circuit-opening position and a closed-circuit position, said member having a central bimetallic actuator portion which is adapted to actuate one of the cooperable parts of said switch to effect said opening of the switch, and (g) clamping means engaging peripheral portions of said bimetallic member, said clamping means comprising an abutment member and a coil spring engaging opposite sides respectively of the bimetallic member.

19. The invention as set forth in claim 18, wherein:

(a) said bimetallic actuator portion is free and clear of attachment to any other parts, (b) said actuator portion being adapted for solely abutting engagement with said one switch part.

* * * * *